United States Patent [19]

Ratskó et al.

[11] 4,365,685
[45] Dec. 28, 1982

[54] EQUIPMENT FOR INFLUENCING THE JACKNIFING ANGLE OF ARTICULATED MOTOR VEHCILES

[75] Inventors: István Ratskó; József Ivony; Jénö Mádi; György Karászi, all of Budapest, Hungary

[73] Assignees: Autóipari Kutató Intézet; Ikarus Karosszéria és Jármügyár, both of Budapest, Hungary

[21] Appl. No.: 180,093

[22] Filed: Aug. 21, 1980

[30] Foreign Application Priority Data

Aug. 21, 1979 [HU] Hungary ............................. AU-429
Aug. 21, 1979 [HU] Hungary ............................. AU-430

[51] Int. Cl.³ ......................... B62D 5/08; B62D 5/10
[52] U.S. Cl. ..................................... 180/135; 180/139
[58] Field of Search ............... 180/139, 136, 140, 152, 180/153, 135

[56] References Cited

U.S. PATENT DOCUMENTS 3,905,438 9/1975 Runyon et al. .................... 180/153
4,109,742 8/1975 Fairchild et al. .................. 180/140

FOREIGN PATENT DOCUMENTS 2732081 1/1979 Fed. Rep. of Germany ...... 180/139

Primary Examiner—John A. Pekar
Attorney, Agent, or Firm—Gabriel P. Katona

[57] ABSTRACT

Equipment influencing the jacknifing angle of an articulated motor vehicle, when the vehicle units are in articulated coupling with each other, has a hydraulic piston device with two working spaces arranged outside the longitudinal centerline of the motor vehicle, the piston of which is connected to one unit, while its cylinder is connected to the other vehicle unit. Each working space is connected through a hydraulic valve unit to the hydraulic space of the hydropneumatic energy source, the valve unit has a parallel connected check valve and choke valve closing from the direction of the working space toward the hydropneumatic energy source. An adjustable transfer cross sectional closing element of the choke valve is in functional connection with the sensor element sensing the steering angle and direction of the front axle and the actuating signal of the sensor element is concomitant with the position of one of the choke valves bringing about increased choking.

10 Claims, 4 Drawing Figures

EQUIPMENT FOR INFLUENCING THE JACKNIFING ANGLE OF ARTICULATED MOTOR VEHCILES

The present invention relates to equipment for influencing the jackkknifing angle in which antijackknifing or jackknifing angle-influencing hydraulic cylinders are arranged between the articulated vehicle units, said cylinders having hydraulic valves controlled from the steering gear of the motor vehicle.

There are antijackknifing devices for vehicles coupled through articulation, in which the piston rods of the two hydraulic cylinders are connected to one of the vehicle units, while the cylinders are connected to the other vehicle unit and the working spaces of the hydraulic cylinders are connected through a control valve. In the shut-off position of the control valve the fluid can not pass out of at least one of the working spaces; thus the cylinder being no longer operative prevents the excessive jackknifing of the vehicle.

Various solutions and suggestions are known for actuation of the control valve. According to the most up-to-date solution as described in the GFR patent disclosure No. 2 420 203, the hydraulic valve pertaining to the cylinder is in functional connection with an electronic computer unit. The electronic unit is connected with the signal device sensing the turn of the steered front wheel, as well as with a signal device sensing the jackknifing angle of the two vehicles, the computer unit compares the electric signal given by these devices with the jackknifing angle fed in beforehand and pertinent to the steering angle of the wheel, and depending on the evaluation, it shuts the hydraulic valve and at least one of the working spaces.

In the construction described in the GFR patent disclosure No. 2 748 713 the hydraulic system—in the interest of lower swing tendency—is prestressed.

The antijackknifing devices have not gained general acceptance in practice for the articulated motor vehicles, because despite their complexity and relatively high investment cost, they do not yield satisfactory results under any driving-dynamic condition.

Exceptions are the buses with rear engine which turned up recently, where the axle of the trailer is driven, and the trailer pushes the front vehicle. This driving mode can not be used without an antijackknifing device, since the pushing force acts in the direction of increasing the jackknifing when the vehicle travels in a curve.

Use of the electric sensors and electronic computer unit for motor vehicles is at the level exceeding the general professional qualification of the operating and maintenance crew, and the conditions for the production and service of electronic units do not exist in most of the motor vehicle manufacturing countries.

The invention is aimed at the realization of equipment influencing the jackknifing angle, which is built up from traditional hydraulic, mechanical and possibly electrical-but not electronic-units, and it is equally useable to prevent the jackknifing or to influence the jackknifing angle of articulated vehicle units, consisting of a towing vehicle and articulated trailer, or articulated trailer and front vehicle pushed by the driven axle of the former one.

A further objective was the realization of such equipment to influence the jackknifing angle, which in addition to exerting a restoring torque against the increasing jackknifing angle—as in the solution according to the GFR patent disclosure No. 2 748 713—prevents the jackknifing counter to the jackknifing direction pertaining to the steering angle of the wheel.

The objective according to the invention is attained with an equipment influencing the jackknifing angle, at which the vehicle units are in articulated coupling with each other. A hydraulic piston device with two working spaces is arranged outside the longitudinal centreline of the motor vehicle, the piston of which is attached to one of the vehicle units, while its cylinder is attached to the other unit. Each working space is connected to the hydraulic space of a hydropneumatic energy source through a hydraulic valve, which has a parallel connected check valve and choke valve closing from the direction of the working space toward the hydropneumatic energy source.

The equipment is characterized by the adjustable transfer cross sectional closing element of the choke valve being in functional connection with the sensor element sensing the steering angle and direction of the front axle. The position of one of the choke valves bringing about increased choking is concomitant with the actuating signal of the sensor.

A favourable embodiment of the equipment is characterized by a given steering direction being concomitant of the closing position of the choke valve, which is connected with the hydraulic working space that prevents the jackknifing direction contrary to the jackknifing direction concomitant with said steering direction.

According to a further favourable characteristic of the equipment a segment is arranged on the element of the steering device, suitably on the steering arm, the displacement of which corresponds to the turn of the steering spindle, and a shoe of frictional material—allowing a limited displacement in the direction of the turn—is supported by the segment. An element senses the directions of displacement of the frictional shoe, which is in motion-transmitting connection with the closing elements of the choke valves.

The displacement-direction sensor is formed as a lever supported by the shoe of frictional material and hydraulic transmitting cylinder. The hydraulic transmitting cylinder is in hydraulic connection with the receiving cylinder, which is in motion-transmitting connection with the closing element of the choke valve.

Another favourable embodiment of the equipment according to the invention is characterized in that one of the inlets of the difference-forming unit is formed by the linearly displaced slide valve giving the output signal of the element sensing the steering angle of the front axle. The other inlet is formed by the linearly displaced slide valve giving the output signal of the element sensing the jackknifing angle.

The slide valves are parallel mounted in opposing directions, the difference-forming unit is formed as a connecting rod attached to the slide valve, the displacement of its preferential point forms the output signal, the sign of which is formed by the direction of displacement. The preferential point is in functional connection with the choke valves of the valve units through the motion transmitting elements.

One of the linearly displaced slide valves is formed as the piston rod of the hydraulic receiving cylinder. The fluid space of the receiving cylinder is connected through a pipe to the hydraulic transmitting cylinder, the piston of which is connected to the steering arm, the turn of which corresponds to the turn of the steered front axle.

One of the linearly displaced slide valves is formed as the piston rod of the hydraulic receiving cylinder. The fluid space of the receiving cylinder is connected with a transmitting cylinder sensing the jackknifing angle through a pipe, the piston of which is connected to one of the vehicle units, while its cylinder is connected to the other vehicle unit.

The mentioned slide valve is coupled to the shifting iron core of the electromagnet, which is connected to a device emitting the electric signal, sensing the angular displacement of the steered front wheel.

The linearly displaced slide valve is coupled to the shifting iron core of the electromagnet, which is connected to a device emitting an electric signal and sensing the jackknifing angle.

The closing position of the choke valve of the valve unit connected to the working space—the value of which is decreasing at jackknifing—is concomitant with the jackknifing angle deviating from the one concomitant with the steering angle of the wheel.

Each pneumatic space of the hydropneumatic energy sources is connected to the source of the pressure medium through an adjustable pressure control valve.

The equipment may by realized also be connecting the pneumatic spaces of the hydtopneumatic energy sources to the pneumatic brake system of the motor vehicle, suitably through the check valves.

The invention is described in detail by way of examples of the embodiment with reference to the enclosed drawing, in which:

FIG. 1.: shows an arrangement of the equipment according to a first example of the invention in an articulated bus;

FIG. 2.: shows equipment as shown in FIG. 1., including the hydraulic sensors;

FIG. 3.: shows an arrangement of the equipment according to a second example of the invention in an articulated bus;

FIG. 4.: shows equipment as shown in FIG. 3., including the hydraulic sensors.

Referring to FIGS. 1a and 2a, the front vehicle 2 and trailer 3 of the motor vehicle 1 are coupled with articulation 4. Two hydraulic cylinders 5a, 5b are fixed to the articulated vehicle units symmetrically to the articulation 4. The piston rods 6a, 6b of hydraulic cylinders 5a, 5b are fixed to the trailer 3, and the cylinders 7a, 7b to the front vehicle 2. Each hydraulic working space 8a, 8b of cylinders 7a, 7b is connected to a valve unit, i.e. the working space 8a through pipe 9a to the valve unit 10a, and the working space 8b through pipe 9b to the valve unit 10b.

The hydraulic space 13a of the hydropneumatic energy source 12a is connected through pipe 11a to valve unit 10a, while the pneumatic space 14a is connected through the check valve 15a and conduit 16a to the pressure medium source 17. The pressure medium source 17 is suitably the non-illustrated pneumatic brake system of the articulated motor vehicle.

Valve units 10a and 10b are of identical construction, the lower fluid space 33 is connected to pipe 9a, the upper fluid space 38 to pipe 11a. Check valve 34 and choke valve 36 are arranged parallel with each other in wall 35 that separates the two fluid spaces. Check valve 34 shuts in case of flow from the direction of the lower fluid space 33 toward the upper fluid space 38. The closing element 37 of choke valve 36 is in functional connection with the difference-forming unit 18.

For the information of the driver and in the interest of adjustability, manometers 45 and externally—manually—actuated pressure controllers 46 are connected with conduits 44 to the pneumatic spaces 14a and 14b of the hydropneumatic energy sources 12a and 12b, as well as with conduits 43 to valves 15a and 15b respectively.

The steering gear 21 of steering device 20 for the steered front axle 19 of the front vehicle 2 is provided with steering arm 22, the angular displacement of which is in proportion with the angular displacement of the steered wheels. The steering arm 22 is connected to an angular displacement sensor formed as a hydraulic transmitting cylinder 25. Piston 26 of the hydraulic transmitting cylinder 25 is in articulated coupling with the steering arm 22, its hydraulic space 27 is connected through pipe 28 to the fluid space 30 of the hydraulic receiving cylinder 29. The spring 32-loaded piston 31 of the hydraulic receiving cylinder forming the steering signal slide valve is connected to the input of the difference-forming unit 18. The spring 49 loaded hydraulic piston 48 forming the jackknifing angle signal slide valve is similarly connected to the input of the difference-forming unit 18, arranged in the hydraulic receiving cylinder 50, the fluid space 51 of which is connected through pipe 52 to the jackknifing angle signal device 40a.

The jackknifing angle signal device 40a is formed as a hydraulic transmitting cylinder 40, the cylinder 41 of which is fixed to the front vehicle 2, its piston 39 to the trailer 3, and a pipe 52 is connected to its fluid space 42.

The difference-forming unit 18 is formed as a mechanism with lever, pistons 31 and 48 are built parallel but opposite each other, to which the difference-forming arm 58 is connected with joints 60 and 59, the preferential points 57a and 57b of which are arranged at a distance from the joints 60 and 59 inversely proportional to the stroke of pistons 31 and 48.

The preferential difference-forming points 57a and 57b are in functional connection through the motion-transmitting elements formed as lever 55 embedded in joint 54 with the closing element 37 of the choke valve of valve units 10a and 10b. In the motionless intermediate position of the difference-forming arm 58 both contact surfaces 56a and 56b of arm 55 are supported by the difference-forming preferential points 57a and 57b, both choke valves 36 are open, because the closing elements 37 are coupled with joints 53 to the levers 55.

The equipment influencing the jackknifing angle functions in the following way:

When the articulated vehicle 1 travels in a straight line, and provided that the steering angle of the wheel $\alpha=0°$, and the jackknifing angle $\phi=0°$, then the difference-forming arm 58 is in the motionless intermediate position, the choke valves 36 of valve units 10 and 10b are open, the hydraulic spaces 8a and 8b of the hydraulic cylinders 5a and 5b are in communication with the fluid spaces 13a and 13b of the hydropneumatic energy sources 12a and 12b. The hydraulic fluid is under pressure prevailing in the pneumatic spaces 14a and 14b, i.e. the system is prestressed, consequently it has a swing damping effect.

If at steering angle $\alpha=0°$ the trailer 3 turns off for instance in the direction of "a", then the hydraulic jackknifing angle transmitting cylinder is compressed, the fluid flows from the hydraulic space 42 into the receiving cylinder 50, it moves the piston 48 in the direction of the expansion, which turns the difference-forming arm 58 around pin 60. Point 57a of the difference-forming arm 58 turns the lever 55 through the supporting counter-surface 56a, and said lever moves the closing element 37 of choke valve 36 of valve unit 10a in the closing direction. The fluid has to overcome a higher resistance against the increased choking effect, in order to flow from the working space 8a of the hydraulic cylinder 5a through pipe 9a, choke valve 36 of valve unit 10a and pipe 11 into the hydraulic space 13a, whereby the cylinder 5a exerts an antijackknifing force. Meanwhile during expansion of the hydraulic cylinder 5a on the "b" side the flow of the fluid is unobstructed from the hydraulic space 13b through pipe 11b, valve unit 10b—its choke valve 36 and check valve 34 being open—and pipe 9b into the hydraulic space 8b. At decreasing jackknifing angle the hydraulic cylinder 5a expands and the fluid flows from the hydraulic space 13a of the hydropneumatic energy source 12a through pipe 11a, check valve 34 and choke valve 36 of valve units 10a, and pipe 9a into the working space 8a. Meanwhile upon compression of the cylinder 5b on the "b" side the fluid flows back from the working space 8b through pipe 9b, open choke valve 36 of valve unit 10b and pipe 11b into the hydraulic space 13b of the hydropneumatic energy source 12b.

When the articulated vehicle travels in a curve the equipment influencing the jackknifing angle at steered front wheel position will function as follows:

The steering device 20 is constructed in such a way, that at steering to the right, i.e. turning the steering wheel 47 to the right, the steering arm 22 turns clockwise and the piston 26 moves outward from the hydraulic transmitting cylinder 25. The fuel flows from the hydraulic receiving cylinder 29 through pipe 28 into the fluid space 27, the receiving piston 31 moves in the direction of compression and turns the difference-forming arm 58.

If the articulated vehicle 1 travels free of abnormal skid in the curve, then $\phi$ jackknifing angle pertinent to steering angle $\alpha$ will develop, thus the hydraulic transmitting cylinder 40 moves in the direction of expansion, fluid flows from the cylinder 51 of the hydraulic receiving cylinder 50 through pipe 52 into the fluid space 42, thus piston 48 moves in the direction of compression and turns the difference-forming arm 58. At convergent angles $\alpha$ and $\phi$ pertinent to each other, due to the movement of pistons 48 and 31, the difference-forming arm 58 turns around its preferential difference-forming points /57a, 57b/, but the point itself does not move, levers 55 remain motionless, and choke valves 36 of valve units 10 and 10b remain in the open position.

Should a jackknifing angle develop different from the $\phi$ pertinent to the steering angle $\alpha$ of the wheel, then the difference-forming point /57a, 57b/ of the difference-forming arm 58 will move into one of the directions and it will shut the choke valve 36 on that side, thereby preventing the increase of the abnormal deviation of the jackknifing angle. When the wheels are understeered—for instance to the left—by the driver at stationary or slowly travelling vehicle, then the steering arm 22 turns anticlockwise, the hydraulic transmitting cylinder 25 moves in the direction of compression, fluid flows from the fluid space 27 through pipe 28 into the receiving cylinder 29, the piston 31 of which moves in the direction of expansion, turns the difference-forming arm 58 around pin 59, which through the lever 55 moves the closing element 37 of choke valve 36 in the closing direction. Thus the equipment for wheels steered to the left does not prevent the starting of the vehicle being at jackknifing angle $\phi=0°$, because it is locked against jackknifing to the right-hand side.

The hydropneumatic energy sources 12a and 12b are charged up or recharged by the pressure medium source 17, suitably by the pneumatic brake system of the vehicle through pressure control valves 15a and 15b.

The manometers 45 indicate the pressure in the energy sources 12a and 12b, while the pressure values can be set separately with the pressure controllers 46.

The other favourable embodiment is described in detail as follows.

Figure 1:
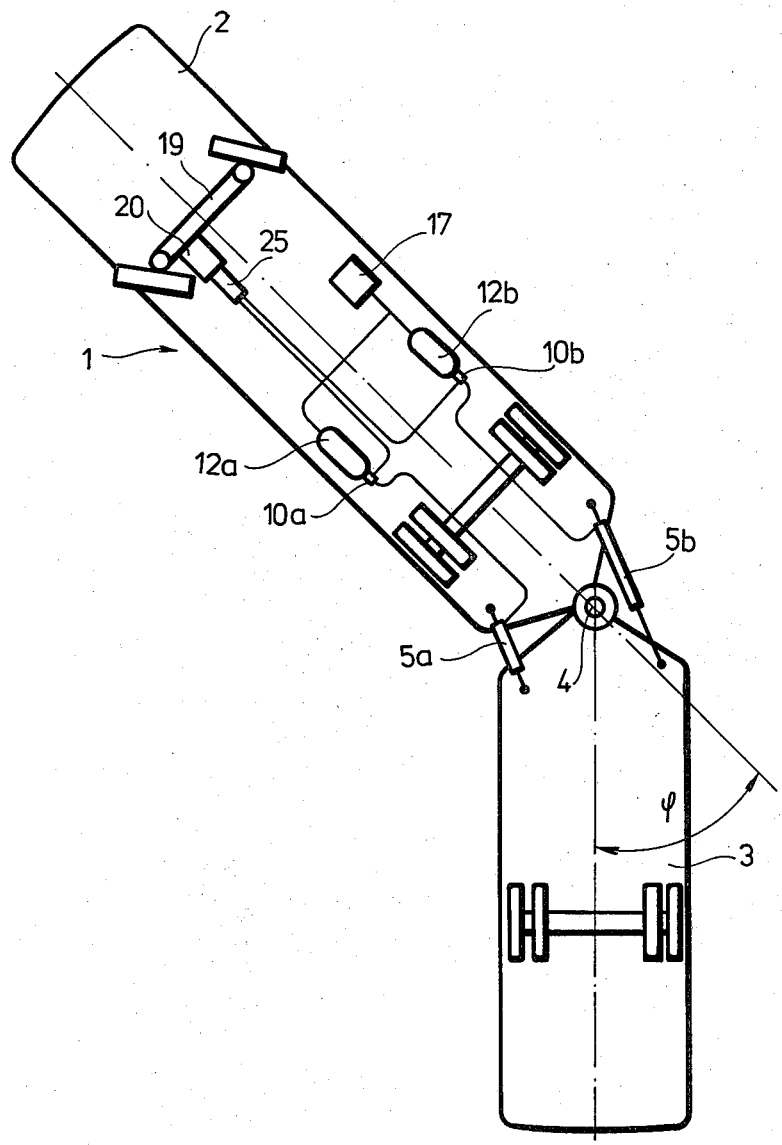
Figure 2:
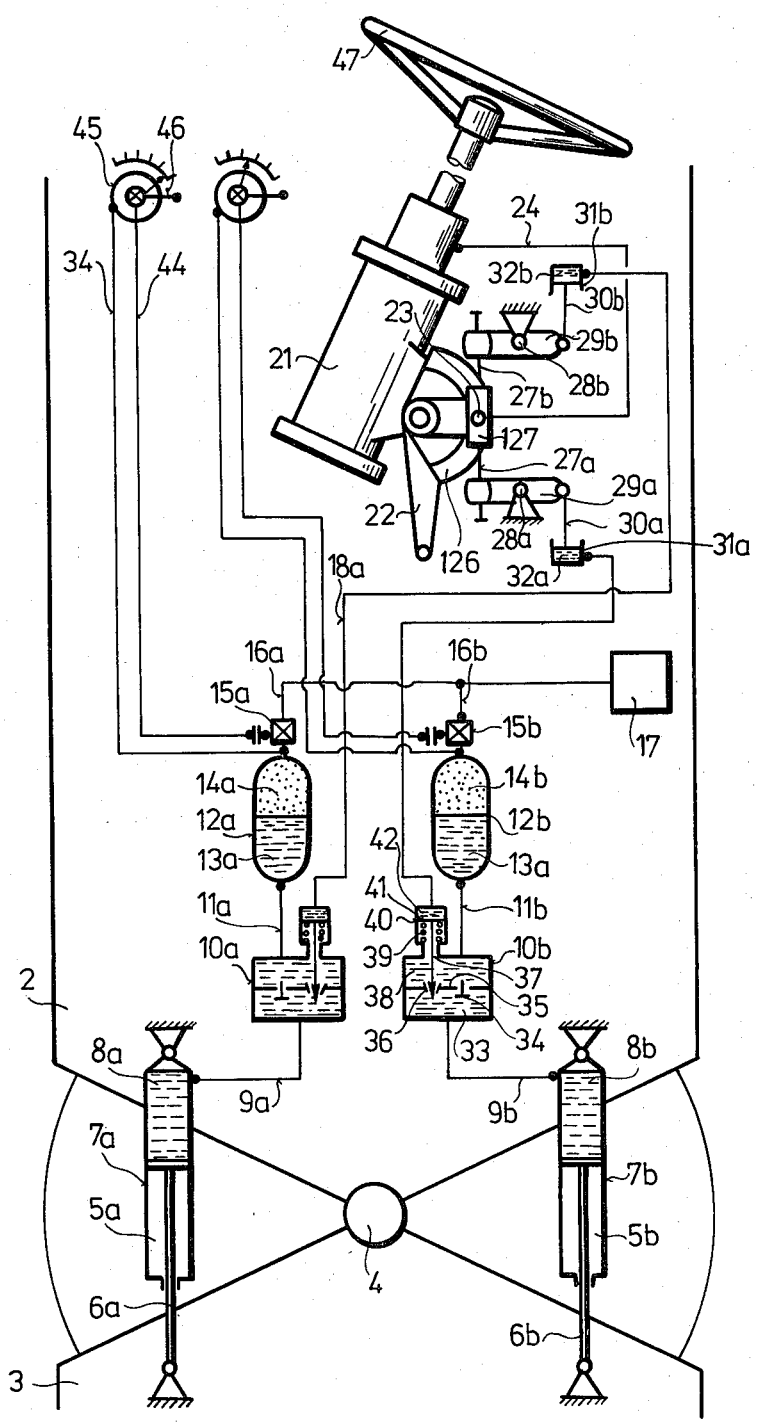
FIG. 2 shows the embodiment of the equipment built up from the hydraulic elements.

The front vehicle 2 and trailer 3 of the motor vehicle are coupled with articulation 4. The hydraulic cylinders 5a, 5b are fixed to the articulated vehicle units symmetrically in relation to the articulation 4. The piston rods 6a, 6b of hydraulic cylinders 5a, 5b are fixed to the trailer 3, and the cylinders 7a, 7b to the front vehicle 2. Each hydraulic working space 8a, 8b of cylinders 7a, 7b is connected to a valve unit, i.e. the working space 8a through pipe 9a to the valve unit 10a, and working space 8b through pipe 9b to valve unit 10b.

The hydraulic space 13a of the hydropneumatic energy source 12a is connected through pipe 11a to valve unit 10a, while the pneumatic space 14a is connected through the check valve 15a and conduit 16a to the pressure medium source 17. The pressure medium source 17 suitably is the non-illustrated pneumatic brake system of the articulated motor vehicle.

The valve unit 10a is in functional connection through the intermediate conduit 18a with the steering device 20 of the steered front axle 19, suitably with the unit 25 sensing the displacement-direction of the steering arm 22 of steering gear 21. In the presented example of the embodiment the displacement-direction sensor 25 is of simple construction, built up from technologically non-demanding mechanical and hydraulic elements.

A segment 126 is fixed onto the steering arm 22 to which a shoe 127 of frictional material and limited movement is pressed supporting the set screws 30a and 30b of the rocker arms 29a and 29b formed as two-armed lever and carried in bearing on pins 28a and 28b.

If the steering gear 21 is a hydraulic power assisted steering, then a hydraulic cylinder 23 with piston, supported by the friction shoe 127 represents a favourable construction embodiment, which is connected to the supply conduit of the hydraulic steering gear with the aid of pipe 24.

The opposite ends of rocker arms 29a and 29b are connected to the hydraulic pistons 31a and 31b. The intermediate conduit 18a is connected to the fluid space of the hydraulic transmitting cylinder 32a of piston 31a, which elements are concomitant with the clockwise turn of the steering arm 22.

The intermediate conduit 18b is connected to the fluid space of the hydraulic transmitting cylinder 32b of piston 31b, which elements are concomitant with the anticlockwise turn of the steering arm 22. Similarly to the side marked as "a", the same elements are found also on side "b", thus the intermediate conduit 18b is connected to the valve unit 10b, which is in connection with the hydraulic space 13b of the hydropneumatic energy source 12b through the pipe 11b. The pneumatic space 14b of the hydropneumatic energy source 12b is connected through the check valve 15b and conduit 16b to the pressure medium source 17.

For the information of the driver and in the interest of adjustability, the hydropneumatic energy sources 12a and 12b are connected with conduits 44 to the penumatic spaces 14a and 14b, while manometers 45 are connected with conduits 45 to the valves 15a and 15b.

Figure 4:
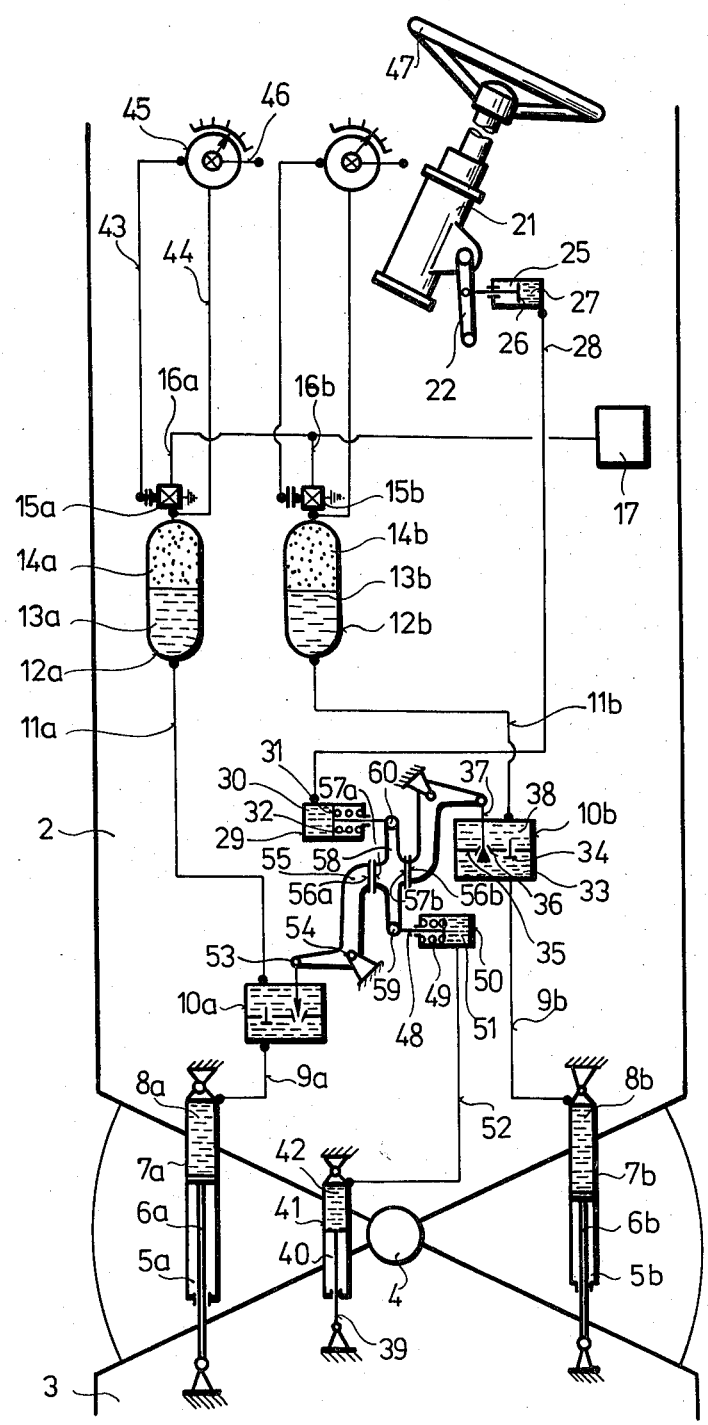

FIG. 4 illustrates the hydraulic valve units 10a and 10b. The lower fluid space 33 of the valve unit 10a is in permanent connection with pipe 9a and its upper fluid space 34 with pipe 11a.

Check valve 36 is built into the wall 35 separating the two fluid spaces, which shuts against the flow from the lower fluid space 33 toward the upper fluid space 34, but allowing the flow from the upper fluid space 34 toward the lower fluid space 33. Choke valve 37 is also built into the wall 35 which in its open position ensures free flow in both directions between the fluid spaces 33 and 34.

The closing element 38 of choke valve 37 is connected through rod 39 to the hydraulic piston 40, the hydraulic cylinder 41 of which is formed as a receiving cylinder is in permanent connection with the intermediate conduit 18b. The spring 42 arranged between the hydraulic receiving piston 40 and hydraulic cylinder 41 forces the closing element 38 of the choke valve 37 toward the open position.

The valve units 10a and 10b are connected to the displacement-direction sensor 25 in such a way, that at a given steering direction the choke valve 37 of that valve unit 10a and 10b will shut off, which is connected to the hydraulic working spaces /8a and 8b/ that prevent the jackknifing direction opposite the jackknifing direction concomitant with the steering direction.

If the anticlockwise turn of the steering arm 22 is pertinent to steering to the right, then this displacement-direction is concomitant with the hydraulic transmitting cylinder 32, which is connected with valve unit 10a. The equipment influencing the jackknifing angle functions as follows:

In the motionless state of the steering gear 21—not only in the intermediate position—the hydraulic transmitting pistons 31a and 31b of the displacement sensor 25 are in an intermediate position, accordingly the choke valves 37 are open, the fluid flows in both directions between the working space 8a and hydraulic energy source 12a through pipe 9a, valve unit 10a, and pipe 11a. If the jackknifing angle between the front vehicle 2 and trailer 3 varies, e.g. in such a way, that the hydraulic cylinder 7a is compressed and the cylinder 7b expands, then fluid flows from the working space 8a into the hydropneumatic energy source 12 causing increased gas pressure. At the same time fluid flows from the hydropneumatic energy source 12b into the working space 8b causing a drop in the gas pressure. The pressure in the working spaces 8a and 8b is identical with that prevailing in the connected gas spaces 14a and 14b, whereby the force arising from the pressure difference exerts a torque around the articulation counter to the direction of jackknifing. The greater is the jackknifing angle, the higher is the counter torque exerted by the hydraulic cylinders 7a, 7b. When the vehicle travels in a straight line, the described effect damps the transverse swing of the trailer.

At a turn of the steering gear the equipment functions as follows:

When steering to the right, the steering arm 22 turns anticlockwise, the friction shoe 127 moves with the segment 126 until impact, it brings the rocker arm 29a and hydraulic transmitting piston 31a into motion, which shuts the choke valve 37 of the valve unit 10a. Thus the fluid can flow through the valve unit 10a only from the hydropneumatic energy source via pipe 11a, check valve 36 and pipe 9a into the working space 8a, consequently the hydraulic cylinder 7a can function only in the direction of expansion, while it is closed against compression. Thus the cylinder 7a allows the jackknifing pertinent to steering to the right, it expands, while in the case of jackknifing in the opposite direction,—i.e. trailer swings outward from the curve—it is closed.

Meanwhile the flow of the fluid between the working space 8b and hydropneumatic energy source 12b is unobstructed in both directions. Upon steering back, in this case to the left, the function of side "a" and "b" is reversed.

Figure 3:
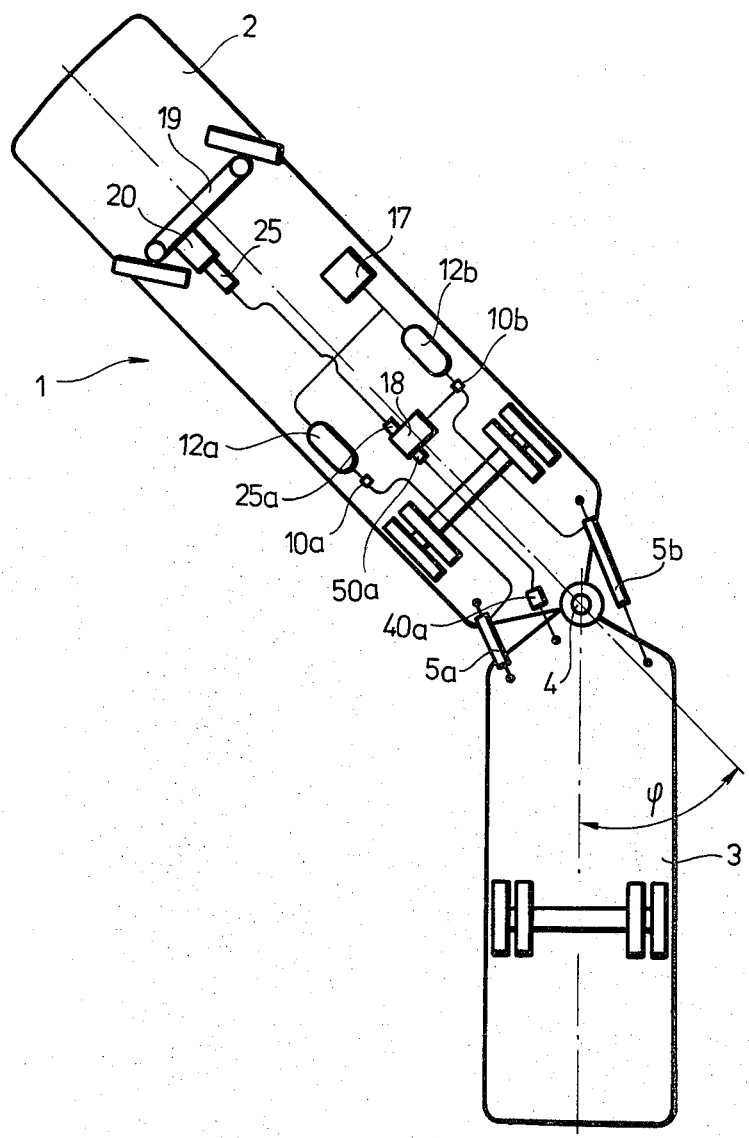
FIG. 3 shows the plan view of the articulated vehicle including the arrangement of the equipment influencing the jackknifing angle.

FIG. 3 shows—among others—the mechanical-hydraulic displacement sensor, which is simple as far as its maintenance and service are concerned. Electric sensors for sensing the displacement of the steering arm 22 and the electromagnets for actuation of the closing element 38 of choke valve 37 are favourably applicable.

In the interest of avoiding instability, possibly arising during operation of the equipment, the electric displacement sensors emit a control signal over a specific limited value of the displacement.

What we claim is:

1. In an apparatus for influencing the jackknifing angle of an articulated motor vehicle, when the vehicle units are in articulated coupling with each other, of the type having a hydraulic piston device with pairs of cylinders with two working spaces arranged outside the longitudinal centerline of the motor vehicle, the piston of which is connected to one vehicle unit, and the cylinder to the other vehicle unit, each working space being connected through a hydraulic valve unit to the hydraulic space of a hydropneumatic energy source, the valve unit having a parallel connected check valve and choke valve closing from the direction of the working space toward the hydropneumatic energy source, the improvement comprising a sensing element for sensing the steering angle of the front axle of the vehicle and for producing an actuating signal in response thereto and wherein the choke valve comprises an adjustable transfer cross sectional closing element connected to the sensing element and responsive to the actuating signal for changing the position of one of the choke valves to increase choking.

2. The apparatus as claimed in claim 1, further comprising a segment arranged on an element of the vehicle steering and having a displacement which corresponds to the turn of the steering wheel, a shoe of frictional material allowing limited displacement in the direction of the turn supported by the segment, a displacement-direction sensor element connected to the closing elements of the choke valves to change the position of the choke valves in response to the displacement-directions of the friction shoe.

3. The apparatus as claimed in claim 2, wherein the displacement-direction sensor comprises a lever supported by the friction shoe and a hydraulic transmitting cylinder in hydraulic connection with a receiving cylinder which is in motion-transmitting connection with the closing elements of the choke valves.

4. The apparatus as claimed in claim 1, further comprising a difference forming unit having one inlet comprising a linearly displaced slide valve receptive of the output signal of the element sensing the steering angle of the front axle and another inlet comprising a linearly displaced slide valve receptive of the output signal of an element sensing the jackknifing angle, the slide valves being mounted in parallel in opposing directions with a connecting rod therebetween, the displacement of which forming an output signal having the sign formed by the direction of displacement, the connecting rod being in functional connection with the choke valves of the valve units through motion-transmitting elements.

5. The apparatus as claimed in claim 4, wherein one of the linearly displaced slide valves comprises the piston rod of a hydraulic receiving cylinder, the fluid space of the receiving cylinder being connected through a pipe to a hydraulic transmitting cylinder, the piston of which is connectable to a steering arm, the turn of which corresponds to the turn of the steering front wheel.

6. The apparatus as claimed in claim 4, wherein one of the linearly displaced slide valves comprises the piston rod of a hydraulic receiving cylinder, the fluid space of the receiving cylinder being connected through a pipe with a hydraulic jackknifing angle-sensing transmitting cylinder, the piston of which is connected to one of the vehicle units and its cylinder to the other vehicle unit.

7. The apparatus as claimed in claim 4, wherein one of the linearly displaced slide valves is connected by an electromagnet to the sensing element.

8. The apparatus as claimed in claim 4, further comprising an electromagnet connected to the other linearly displaced slide valve and the element sensing the jackknifing angle.

9. The apparatus as claimed in claim 1, wherein each pneumatic space of the hydropneumatic energy sources is individually connected to a pressure medium source through an adjustable pressure control valve.

10. The apparatus as claimed in claim 1, wherein the pneumatic spaces of the hydropneumatic energy sources are connected through the check valves to the pneumatic brake system of the motor vehicle acting as a pressure medium source.

* * * * *